United States Patent [19]

Berkovich et al.

[11] Patent Number: 5,392,291
[45] Date of Patent: Feb. 21, 1995

[54] FAULT-TOLERANT CITO COMMUNICATION SYSTEM

[75] Inventors: Semyon Berkovich, Rockville; Chris J. Walter; Henry C. Yee, both of Columbia, all of Md.

[73] Assignee: AlliedSignal Inc., Morris Township, Morris County, N.J.

[21] Appl. No.: 703,025

[22] Filed: May 20, 1991

[51] Int. Cl.⁶ ............... G06F 11/00; H04J 3/12; H04J 15/00
[52] U.S. Cl. .................... 371/10.3; 370/119; 370/110.4
[58] Field of Search ........... 371/10.3, 8.2, 20.1, 371/20.6, 10.1; 370/110.4, 119

[56] References Cited

U.S. PATENT DOCUMENTS

| | | | |
|---|---|---|---|
| 4,545,011 | 10/1985 | Lyon et al. | 364/200 |
| 4,751,656 | 6/1988 | Conti et al. | 364/488 |
| 4,768,193 | 8/1988 | Takemae | 371/10 |
| 4,891,639 | 1/1990 | Nakamura | 340/825.5 |
| 4,894,827 | 1/1990 | Ramsay et al. | 371/8.2 |
| 4,947,394 | 8/1990 | Nakajima et al. | 371/20.1 |
| 5,023,873 | 6/1991 | Stevenson et al. | 371/8.2 |
| 5,146,456 | 9/1992 | Berkovich | 370/110.4 |
| 5,239,537 | 8/1993 | Sakauchi | 370/16 |

*Primary Examiner*—Robert W. Beausoliel, Jr.
*Assistant Examiner*—Joseph E. Palys
*Attorney, Agent, or Firm*—Howard G. Massung

[57] ABSTRACT

A communication method and apparatus incorporating fault-tolerance and increased transmission reliability in a content-induced transaction overlap (CITO) system is disclosed. The system is driven by an error-detecting and correcting CITO-based protocol whereby transient failures are transparent to the user. A parity check is built into the protocol for detecting failures due to hard faults. A redundancy configuration is also disclosed which permits circumvention of fabrication defects, thereby allowing an increased manufacturing yield.

21 Claims, 2 Drawing Sheets

FAULT-TOLERANT CITO COMMUNICATION SYSTEM

BACKGROUND OF THE INVENTION

1. Field of the Invention

The present invention relates to a data communication network, and more particularly to a communication structure and method for incorporating fault-tolerance in a content-induced transaction overlap (CITO) system.

2. Description of the Background

All communication systems are subject to errors in data transmission due to hardware failures, noise, etc. The corruption of data resulting from these transmission errors is a significant problem. In addition, the semiconductor devices used in such communication systems may contain fabrication defects which contribute to errors in data transmission. In this case, disposal of the responsible component is the typical remedy. However, designers are finding ways to make semiconductor devices fault-tolerant in an effort to increase operational reliability and manufacturing yield.

The above-described problem of data transmission errors may be corrected using the well-known concept of error-corrective coding. Error-corrective coding may be implemented in a variety of ways ranging from simple parity checking to more sophisticated schemes having broader error correction capabilities. For instance, to increase the reliability of a communication system having a plurality of transceivers, the system can be designed to use multiple voting logic. This is accomplished by coupling each transceiver to a plurality of mediators. Counterpart data is sent from each transceiver to each of its connected mediators, and the mediators compare the received data to insure its consistency. The system becomes more reliable as the number of replicate data increases. For instance, FIG. 1 illustrates a system arranged in a "latin square" where each transceiver $T_{1-16}$ communicates each bit of data in triplicate to three mediators $M_{X1-4}$, $M_{Y1-4}$ and $M_{Z1-4}$. If the data bit is a logic "1", the three mediators should receive a $<1,1,1>$. Otherwise a transmission error has obviously occurred. In the case of a transmission error the mediators may "vote", whereby the data is interpreted on a two-out-of-three vote basis. This is known as "multiple voting logic". Alternately, the mediators may request that the data be retransmitted. Either way, the reliability is clearly increased.

In addition to providing a solution for transmission errors, the "latin square" of FIG. 1 make further economies possible. It is well-known that the manufacturing yield of semiconductor devices can be dramatically increased if fault-tolerant devices are designed with redundant circuits which can be substituted for defective circuits.

Unfortunately, multiple voting logic requires at least three data bits. This necessitates a three-dimensional matrix configuration as in FIG. 1 which requires a complex printed circuit board. Moreover, detecting and correcting multiple faults becomes rather complicated.

The present invention introduces error-corrective coding in a content-induced transaction overlap (CITO) communication system, and indeed, illustrates how the CITO protocol lends itself to the concept of error-correction. The same increased reliability as in the latin square arrangement of FIG. 1 is achieved with a simpler two-dimensional matrix arrangement and a unique adaptation of the CITO protocol. The present invention also provides a fault-tolerant redundant architecture for by-passing error-causing faults.

The CITO communication protocol is disclosed in U.S. Pat. No. 4,493,074 issued to Walter et al. (herein incorporated by reference). CITO is a combined communication protocol and method for compressing data to be sent from a plurality of senders over a single serial communication channel. The CITO protocol overlaps redundant data sent by different senders so that the total transmission time for all data is reduced. The efficiencies gained by use of the CITO protocol are significant. It would be a further advantage if CITO-based semiconductor devices could be made more reliable by use of error-corrective coding, and fault-tolerant by use of redundancy circuits.

SUMMARY OF THE INVENTION

It is, therefore, an object of the present invention to incorporate fault-tolerance in a CITO communications system to accommodate manufacturing defects, thereby increasing the yield of VLSI structures.

It is another object of the invention to provide an error-detecting/correcting CITO-based protocol whereby transient failures are transparent to the user.

It is another object of the invention to provide a fault-tolerant CITO-based communication system with numerous commercial applications.

It is further object to accomplish the foregoing with a matrix-array of transceivers and mediators, and simple software modifications to the basic CITO protocol.

According to the present invention, the above-described and other objects are accomplished by providing a method and apparatus for communicating data from a plurality of transceivers to a mediator over a communication channel using a fault-tolerant modification of the CITO communication protocol. The method comprises a first step of transmitting from each transceiver over the communication channel the highest order bit of a data word remaining to be sent (the bit being represented in bi-phase code and being one of a logic "1" and a logic "0"), a second step of monitoring the state of the communication channel at each transceiver (the state being one of four possible states including a logic "1", a logic "0", a conflict state, and an inactive state), a third step of operating each transceiver in accordance with the state of the communication channel, the third step further including transmitting the next highest order bit of data from each transceiver having transmitted a logic "0" in the first step when the state of the communication channel equaled one of a logic "1", a latent state, and a logic "0", transmitting the next highest order bit of data from each transceiver having transmitted a logic "1" in the first step when the state of said communication channel equaled a conflict state, suspending bit transmission from each transceiver having transmitted a logic "1" in said first step when the state of said communication channel is one of a logic "0" and an inactive state, thereby rendering such transceivers inactive, and terminating bit transmission from each transceiver having transmitted a logic "0" in said first step when the state of the communication channel was a conflict state, thereby rendering such transceivers inactive, a fourth step of receiving data at said mediator interpreted from said communication channel state, the fourth step further including interpreting the inactive state, logic "0" state and logic "1" state as a logic "0", interpreting the conflict state as a logic "1", repeating the second through fourth steps until all transceivers are inactive, and generating a parity check from a transceiver which has transmitted an entire data word, a sixth step of discarding data received by the mediator in the fourth step when all transceivers are inactive and no transceiver has generated a parity check, the discarded data being the product of a transmission error.

In addition, a system for communicating data is disclosed, comprising a plurality of communication channels, a plurality of mediators each coupled to one of the communication channels, the mediators also being interconnected, a plurality of transceivers each for transmitting data according to a content induced transaction overlap (CITO) protocol, the transceivers each being coupled to all of the communication channels for parallel transmission of a CITO encoded message whereby the interconnected mediators detect a transmission error when a message received thereby fails to correspond to the message sent by the transceivers.

While the proposed invention does not reduce manufacturing defects and transmission errors, it provides a simple method for detecting errors and correcting transient errors or bypassing hard faults in a CITO-based system. Thus, it is possible to obtain a working CITO-based semiconductor device from that which would normally be a reject.

BRIEF DESCRIPTION OF THE DRAWINGS

Other objects, features and advantages of the present invention will become more apparent from the following detailed description of preferred embodiments and certain modifications thereof when taken together with the accompanying drawings, in which.

DETAILED DESCRIPTION OF THE PREFERRED EMBODIMENT

This invention is an improvement to the CITO communication protocol described in U.S. Pat. No. 4,493,074, which document is herein incorporated by reference. The invention is a modified CITO communication protocol for a multi-dimensional communication network incorporating increased transmission reliability.

In essence, the original CITO protocol specifies that when a transceiver sends a logic "1" and the monitored state of the communication channel is "0" (indicating that other transceivers are transmitting a logic "0"), the transceiver will suspend its operation and become inactive until all lexicographically smaller words have been sent by the other transceivers. The protocol results in data words being sent in order of smallest to largest binary value. The present invention retains the basic operating principle of the original CITO, but modifies the decision rules (based on the state of the communication lines following transmission of a data bit) to account for transmission errors in a matrix-oriented communication system. The currently preferred embodiment of the present invention utilizes a two-dimensional matrix arrangement because it strikes a practical balance between increased reliability and circuit complexity.

Figure 2:
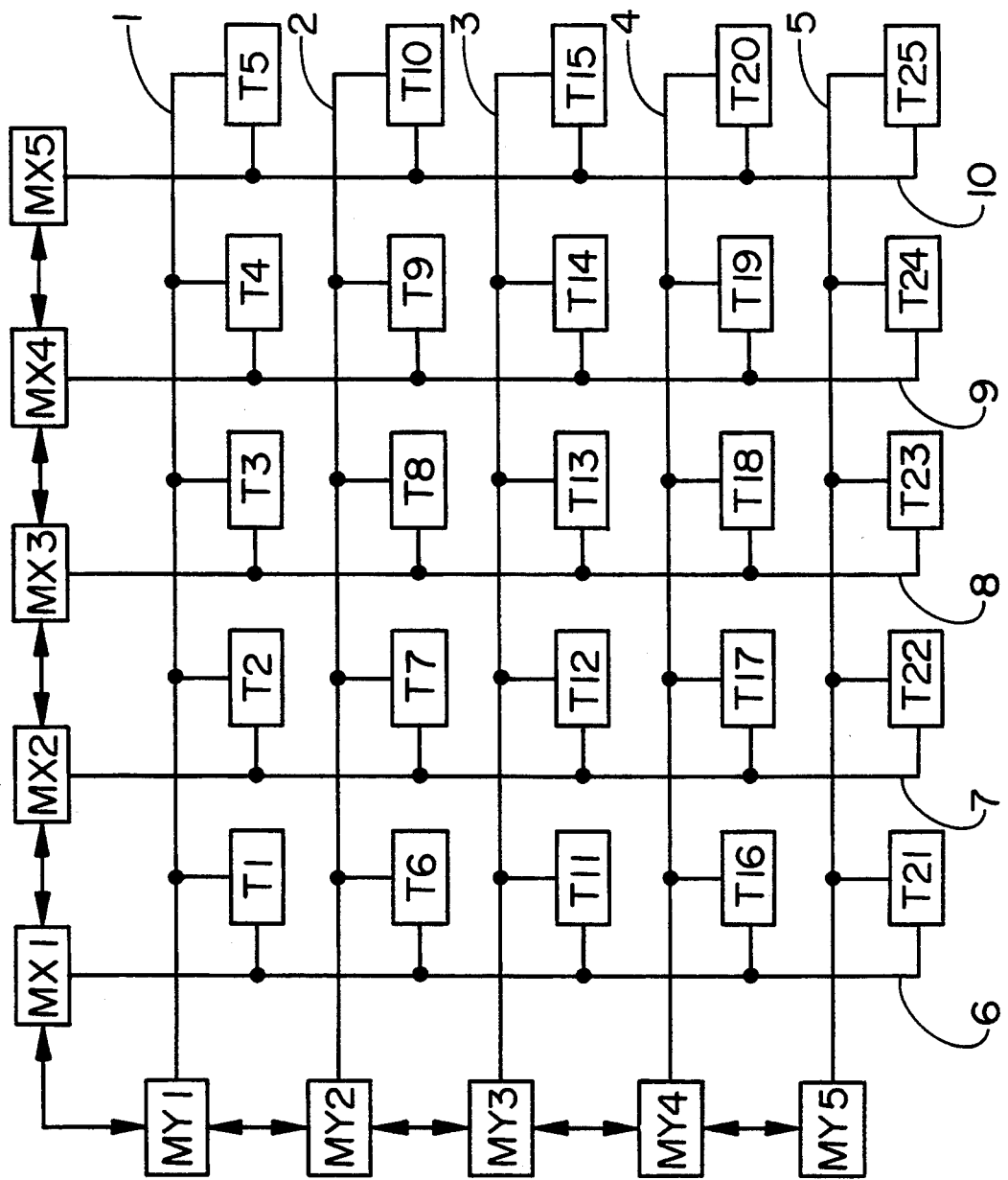
FIG. 2 illustrates a two-dimensional matrix-oriented communication system according to a preferred embodiment of the present invention.

FIG. 2 illustrates a two-dimensional redundancy configuration in accordance with a preferred embodiment of the present invention. Each transceiver $T_{1-20}$ transmits each bit of data onto two communication lines. For example, transceiver $T_n$ transmits each bit in the form of $<X,Y>$, the X data being received by mediator $M_x$ and the Y data being received by mediator $M_y$. This two-dimensional structure is far less complex, and it is quite simple to incorporate redundancy into the system for the purpose of increasing manufacturing yield.

Redundancy is accomplished by providing a redundant row-oriented communication channel and a redundant column-oriented channel. For example, if a 16-port communication system is desired, a typical two-dimensional system would be arranged in a 4-by-4 matrix of 4 mediators each coupled to one of four rows of interconnected transceivers, and 4 mediators each coupled to one of four columns of interconnected transceivers. However, the present invention incorporates one additional redundancy row 5 and redundancy column 10 as shown in FIG. 2, resulting in a 5-by-5 matrix. This way, the redundancy row 5 and column 10 can be substituted for a row and column containing a faulty node.

The mediators Mx1-x5 are each coupled across a corresponding column of transceivers. For example, mediator Mx1 is coupled to each of transceivers $T_1$, $T_6$, $T_{11}$, $T_{16}$ and $T_{21}$. Likewise, mediators $M_{y1-5}$ are each coupled across a corresponding row of transceivers. For example, mediator My1 is coupled to each of transceivers $T_1$, $T_2$, $T_3$, $T_4$ and $T_5$. The $M_x$ and $M_y$ mediators are interconnected to allow communication therebetween for the purpose of comparing received data.

In operation, each active transceiver $T_1-T_4$, $T_6-T_9$, $T_{11}-T_{14}$ and $T_{16}-T_{19}$ (the non-active transceivers being reserved as a redundancy row and column) transmits a bit of data in the redundant form $<X,Y>$, the X value being equal to the Y value unless a transmission error occurs. The X value is transmitted over the connected one of column-oriented communication lines 1-4, and the Y value is transmitted over the connected one of row-oriented communication lines 6-9. Hence, each transceiver may attempt to transmit one of two possible redundant codes: $<1,1>$ representing a logic "1", and $<0,0>$ representing a logic "0". However, the corresponding $M_x$ and $M_y$ mediators will collectively receive one of four possible redundant codes: $<0,0>$, $<1,1>$, $<1,0>$, and $<0,1>$, depending on the data sent by the other connected transceivers.

At this point, transmission errors would normally go unchecked. But the present invention provides an improved set of interpretive rules to account for transmission errors. The interconnected $M_x$ and $M_y$ mediators output the received data back onto the same communication lines. The transceivers receive the data and interpret the received data as follows: $<1,1>$ is interpreted as a logic "1", and $<1,0>$, $<0,1>$ and $<0,0>$ are all interpreted as a logic "0". Data transmission then continues in accordance with the original CITO protocol.

As an example, if transceiver $T_1$ transmits a logic "1" $<1,1>$, but a $<1,0>$ is received ($M_{x1}$ receiving a 1 on line 6 and $M_{y1}$ receiving a 0 on line 1), then $M_{x1}$ and $M_{y1}$ will re-transmit the logic $<1,0>$ ($M_{x1}$ transmitting a 1 on line 6 and $M_{y1}$ transmitting a 0 on line 1).

The active transceivers then monitor both connected communication lines, and proceed according to a modified set of decision rules derived from the conventional CITO protocol.

The complete set of decision rules for each transceiver $T_1-T_{25}$ according to the present invention is shown in Table 1 below.

TABLE 1

Decision Rules for Transceivers

| Data Transmitted by Transceiver | Status of Communication Channel | Transceiver decision rule |
|---|---|---|
| <0,0> | <0,0> | CONTINUE (Normal-Operation) |
| <0,0> | <0,1> | CONTINUE (Single-line transmission error) |
| <0,0> | <1,0> | CONTINUE (Single-line transmission error) |
| <0,0> | <1,1> | TERMINATE (Double-line transmission error) |
| <1,1> | <0,0> | SUSPEND (Normal-Operation) |
| <1,1> | <1,1> | CONTINUE (Normal-Operation) |
| <1,1> | <0,1> | SUSPEND (Single-line transmission error) |
| <1,1> | <1,0> | SUSPEND (Single-line transmission error) |

Data transmission continues in accordance with the modified CITO protocol, with transceivers subsequently monitoring the state of the communication channel and increasingly suspending operation.

If there is no transmission error, data transmission will proceed in a normal fashion according to CITO protocol until one transceiver has sent an entire word of data. A standard CITO bit competition is then performed and transmission resumes at the transceiver having the next smallest data word. The process repeats until all transceivers have transmitted their respective data words.

If there is a single-line transmission error the conflicting state of the communication lines X and Y will be interpreted to be a logic "0", and the transceivers will continue normal transmission according to the CITO protocol. In this case, the transceiver may have actually intended to transmit a logic "0". If so, the transceiver's interpretation was correct and operation will continue momentarily unaffected by the error. However, if the transceiver had intended to transmit a logic "1" the transceiver's interpretation of the communication channel state will have been incorrect. Nevertheless, as shown in Table 1, normal CITO operation will continue. However, in this case all transceivers will eventually suspend their transmission in accordance with CITO protocol before a full data word can be transmitted by any transceiver.

After all transceivers have transmitted a data word, or after all transceivers have suspended transmission and a timeout has occurred, the transceivers perform a diagnostic check. The diagnostic check may include the simultaneous transmission by all transceivers of a 0 followed in sequence by a 1 on both of the X and Y channels.

Generally, the state of the communication channel will correspond to the transmitted data. In this case, the transceivers may prepare to send another message. This is also true in the case where a timeout has occurred (indicating a transmission error), but no hard fault exists. In this case the system will pass the parity check. The transceivers will recognize that the error was transient from the timeout coupled with the passed parity check. Thus, the transceivers will discard the last CITO message received and will attempt to re-transmit the message.

Occasionally the transmission error will be attributable to a hard fault. In this case, the hard fault will be detected and isolated during the parity check. The transceivers will discard the last CITO message received and will eliminate the fault-carrying node from the system using conventional adjustments. The redundant row and column can be substituted for the faulty row/column.

The net results of the above-described invention include high reliability data transmission and fault-tolerance. These advantages come at the expense of slightly increased transmission time owing to the parity check. However, this will be offset by the time saved by CITO transmission.

Figure 1:
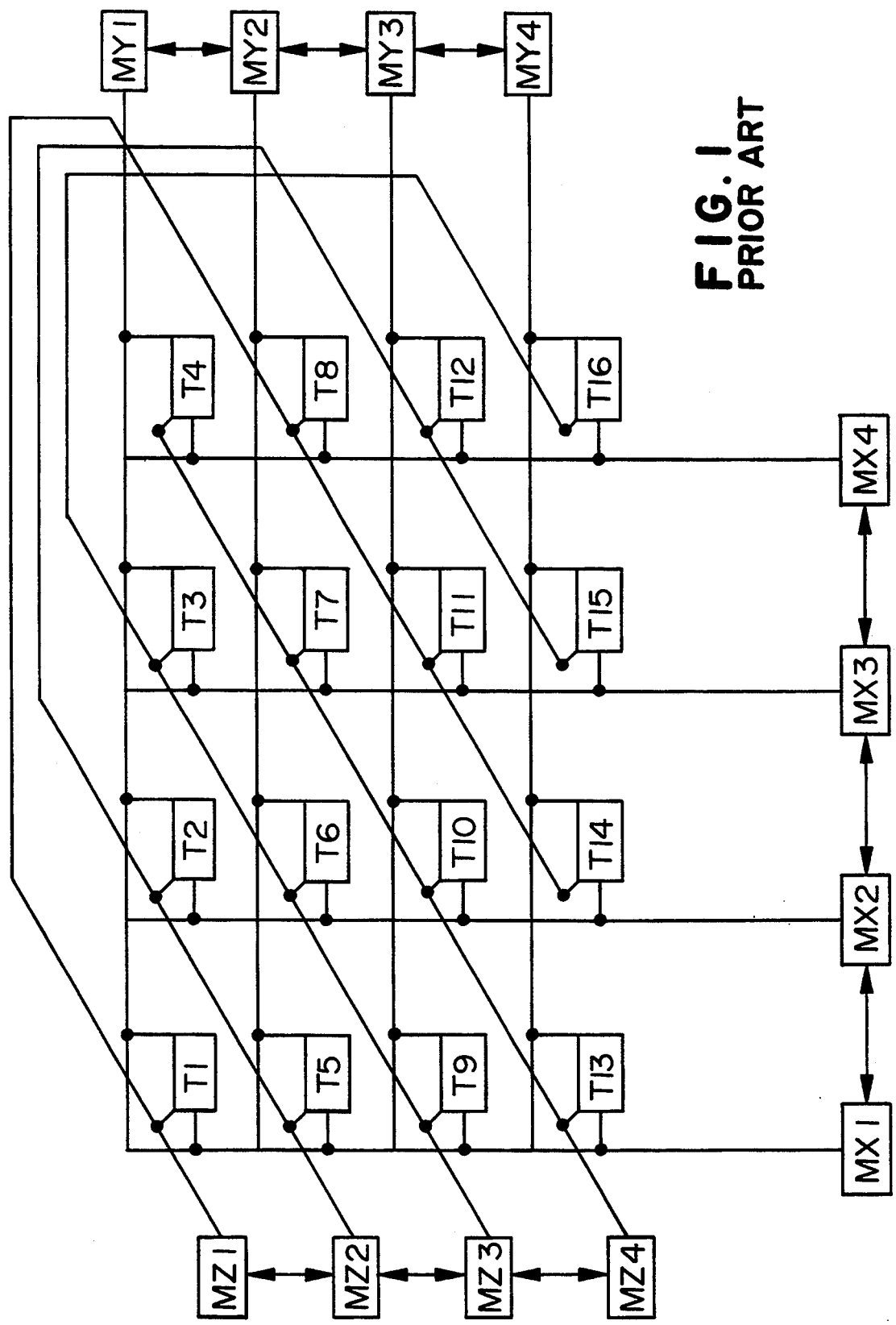
FIG. 1 is a matrix-oriented communication system arranged in a "latin square".

Although the two-dimensionalmatrix arrangement of FIG. 2 is the currently preferred embodiment, the invention may be practiced with a higher degree of redundancy. For example, the invention may be practiced with a three-dimensional matrix system as in the latin squares of FIG. 1. In a three-dimensional arrangement, each data bit transmitted by a transceiver is sent on three different communication lines to give a second level of redundancy, i.e. each bit is transmitted in the form $<X,Y,Z>$. The decision rules for the transceivers can be modified in the above-described manner to account for the additional level of redundancy and the overall reliability of the system will exceed the two-dimensional matrix system.

Hence, the reliability of the system can be increased with each additional layer of redundancy.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A method for communicating data according to a modified CITO protocol, the method comprising the steps of:
   providing a plurality of communication lines arranged in a two-dimensional matrix with row communication lines and column communication lines;
   providing a plurality of transceivers, each transceiver being connected to one of the row communication lines and to one of the column communication lines;
   providing a plurality of mediators, each mediator being connected to one of said communication lines;
   the method further includes:

a first step of transmitting from each said transceiver over each of said connected communication lines, a highest order bit of a data word, said bit being one of a logic "1" or a logic "0";

a second step of receiving a data bit on each communication line at a corresponding mediator, and outputting the received data bit back onto the corresponding communication line, the data output by corresponding mediators to the communication line constituting a state of said communication line;

a third step of monitoring the state of each communication line at each connected transceiver;

a fourth step of operating each transceiver in accordance with the state of each connected communication line as monitored in said third step, said fourth step further comprising, transmitting from each transceiver on connected communication lines the next highest order bit of said data word when said transceiver transmitted a logic "0" in the first step and the state of at least one connected communication line as monitored in said third step equals a logic "0", transmitting from each transceiver on connected communication lines the next highest order bit of said data word when said transceiver transmitted a logic "1" in the first step and the state of all connected communication lines as monitored in said third step equals a logic "1", suspending bit transmission from each transceiver when said transceiver transmitted a logic "1" in the first step and the state of at least one connected communication line as monitored in said third step equals a logic "0", terminating bit transmission from each transceiver when said transceiver transmitted a logic "0" in the first step and the state of said connected communication lines as monitored in said third step equals a logic "1";

a fifth step of transmitting from each active transceiver over each of said connected communication lines a highest order bit of a data word remaining to be sent, said bit being one of a logic "1" or a logic "0";

repeating said second through fifth steps until bit transmission is suspended at all transceivers;

a sixth step of generating a parity check from all transceivers.

2. The method according to claim 1, further comprising a seventh step of discarding data received by said mediators in said fourth step when bit transmission is suspended at all transceivers and no transceiver has transmitted a data word, the discarded data being the product of a transmission error.

3. The method according to claim 2, further comprising repeating said first through seventh steps when said transmission error occurs in order to reattempt communication of said data.

4. A method for managing transmission errors during transmission of data, said data being transmitted according to a CITO protocol, said method comprising the steps of:

providing a plurality of communication lines arranged in a two-dimensional matrix with row communication lines and column communication lines;

providing a plurality of transceivers, each transceiver being connected to one of the row communication lines and to one of the column communication lines;

providing a plurality of mediators, each mediator being connected to one of said communication Lines;

said method further includes:

a first step of transmitting from each transceiver over both connected communication lines a highest order bit of a data word, said bit being one of a logic "1" or a logic "0";

a second step of receiving data at each of said mediators and outputting said data back onto said communication lines;

a third step of monitoring both connected communication lines at each transceiver;

a fourth step of operating each transceiver in accordance with a modified CITO protocol, said modified CITO protocol further comprising, transmitting from each transceiver on both connected communication lines the next highest order bit of said data word when said transceiver transmitted a logic "0" in the first step and the state of at least one connected communication line as monitored in said third step equals a logic "0", transmitting from each transceiver on both connected communication lines the next highest order bit of said data word when said transceiver transmitted a logic "1" in the first step and the state of both connected communication lines as monitored in said third step equals a logic "1", suspending bit transmission from each transceiver when said transceiver transmitted a logic "1" in the first step and the state of at least one connected communication lines as monitored in said third step equals a logic "0", terminating bit transmission from each transceiver when said transceiver transmitted a logic "0" in the first step and the state of both of said connected communication lines as monitored in said third step equals a logic "1".

5. The method according to claim 4, further comprising performing a CITO bit competition when a transceiver has transmitted an entire data word.

6. The method according to claim 4, further comprising repeating said second through fourth steps until all transceivers are suspended, and a fifth step of generating a parity check from all transceivers.

7. The method according to claim 4, further comprising a fifth step of discarding data received by said mediators in said fourth step when all transceivers are inactive and no transceiver has transmitted a data word, the discarded data being the product of a transmission error.

8. In a data communication system having a plurality of interconnected mediators and a plurality of transceivers arranged in a two-dimensional matrix-array with a first communication line connecting each row of transceivers to a corresponding mediator, and a second communication line connecting each column of transceivers to a corresponding mediator, said transceivers communicating data to a common mediator, a method for managing transmission errors during transmission of data according to a CITO protocol, comprising:

a first step of transmitting from each transceiver over both connected communication lines a highest order bit of a data word, said bit being one of a logic "1" or a logic "0";

a second step of receiving said transmitted data bit at a mediator, and outputting the data back onto both communication lines;

a third step of monitoring both connected communication lines at each transceiver;

a fourth step of operating each transceiver in accordance with a modified CITO protocol, said modified CITO protocol further comprising, transmitting from each transceiver on both connected communication lines the next highest order bit of said data word when said transceiver transmitted a logic "0" in the first step and the state of at least one connected communication line as monitored in said third step equals a logic "0", transmitting from each transceiver on both connected communication lines the next highest order bit of said data word when said transceiver transmitted a logic "1" in the first step and the state of both connected communication lines as monitored in said third step equals a logic "1", suspending bit transmission from each transceiver when said transceiver transmitted a logic "1" in the first step and the state of at least one connected communication lines as monitored in said third step equals a logic "0", terminating bit transmission from each transceiver when said transceiver transmitted a logic "0" in the first step and the state of both of said connected communication lines as monitored in said third step equals a logic "1";

a fifth step of transmitting from each active transceiver over each of said connected communication lines a highest order bit of a data word remaining to be sent, said bit being one of a logic "1" or a logic "0";

repeating said second through fifth steps until all transceivers are inactive.

9. The method according to claim 8, further comprising performing a CITO bit competition when a transceiver has transmitted an entire data word.

10. The method according to claim 8, further comprising repeating said second through fifth steps until all transceivers are suspended, and a sixth step of generating a parity check from all transceivers.

11. The method according to claim 10, wherein said parity check generated by said transceiver is sequentially transmitted logic "1" or logic "0" sent on one connected communication line, and sequentially transmitted logic "0" and logic "1" sent on another connected communication line.

12. The method according to claim 11, wherein a fault identified by said parity check is thereafter excluded from operation of the system.

13. A system for communicating data in accordance with a modified CITO protocol, said system comprising:

a plurality of communication lines, arranged in a two-dimensional matrix with row communication lines and column communication lines;

a plurality of mediators each coupled to one of said communication lines, said mediators also being interconnected;

a plurality of transceivers, said transceivers each being coupled to one of said row communication lines and to one of said column communication lines for parallel transmission of a CITO encoded message, said interconnected mediators receiving the CITO encoded message and outputting it back on the corresponding communication line, and said transceivers detecting a transmission error when a message received thereby fails to correspond to the message sent by the transceivers.

14. The communication system according to claim 13, wherein said transceivers conduct a parity check following transmission of a message.

15. The communication system according to claim 13, wherein said communication channels are arranged in a matrix configuration of channel rows and columns, and each transceiver is connected to one of said rows and one of said columns for transmitting a CITO encoded message thereon.

16. The communication system according to claim 15, wherein said matrix configuration includes a redundancy row and redundancy column to be substituted for a row and column containing a fault.

17. The communication system according to claim 13, wherein said communication channels are arranged in a three-dimensional matrix configuration of X lines, Y lines and Z lines, and each transceiver is connected to one of said X lines, Y lines and Z lines for transmitting a CITO encoded message thereon.

18. The communication system according to claim 17, wherein said matrix configuration includes a redundancy X line, a redundancy Y line and a redundancy Z line to be substituted for an X line, Y line and Z line having a fault.

19. A modified CITO protocol for transmitting data in a multi-dimensional communication system having a plurality of communication channels arranged in a matrix configuration of row and column communication lines, respectively, a plurality of interconnected mediators each of which coupled to one of said communication lines, and a plurality of transceivers each being connected to one of said row communication lines and to one of said column communication lines for transmitting a CITO encoded message thereon, said interconnected mediators receiving the CITO encoded message and outputting it back to the coupled communication line, and said transceivers detecting a transmission error when the message received thereby fails to correspond to the message sent by the transceivers, said modified CITO protocol including suspending bit transmission from each transceiver when said transceiver transmitted a logic "1" and the state of at least one connected communication lines as monitored equals a logic "0", and terminating bit transmission from each transceiver when said transceiver transmitted a logic "0" and the state of said connected communication lines as monitored equals a logic "1".

20. A modified CITO protocol of claim 19 further comprising generating a parity check from all transceivers when all transceivers are suspended.

21. A modified CITO protocol of claim 19, further comprising discarding data received by said mediators when all transceivers are inactive and no transceivers has generated a parity check, the discarding data being the product of a transmission errors.

* * * * *